June 20, 1967 W. H. PEARCE 3,327,056

TELEPHONE MONITOR

Filed July 30, 1964

INVENTOR

W. H. PEARCE

BY John N. Randolph

ATTORNEY

United States Patent Office 3,327,056
Patented June 20, 1967

3,327,056

TELEPHONE MONITOR

William H. Pearce, 465 Church St.,
Many, La. 71449

Filed July 30, 1964, Ser. No. 386,314
5 Claims. (Cl. 179—1)

This invention relates to a novel device of extremely simple construction which may be readily connected to the wiring of a conventional telephone to enable use of the telephone as a listening device when the receiver is off of the cradle.

More particularly, it is an object of the present invention to provide an attachment which may be readily interposed in the wiring of a conventional telephone and which, when in operation and with the telephone receiver off of the cradle, will enable a call to be placed to the telephone, equipped with the monitor attachment, so that the calling party may hear any sounds adjacent to or in a room in which the telephone is located.

A further object of the invention is to provide a monitoring or listening attachment for a telephone which requires no special skill to connect the attachment to the wiring of the telephone, and which attachment can be rendered completely inoperative by merely moving a part thereof to a circuit closing or a circuit bridging position.

A particular object of the invention is to provide a device which may be employed with a conventional telephone so that the sounds of machinery or other operating equipment may be heard by a party making a call to the telephone which is located in the vicinity of the machinery or the equipment. However, the attachment has many other obvious uses as will be readily apparent to those skilled in the art to which the invention relates.

Various other objects and advantages of the invention will hereinafter become more fully apparent from the following description of the drawing, illustrating a presently preferred embodiment thereof, and wherein.

Figures 1, 2, 3, 4, 5:
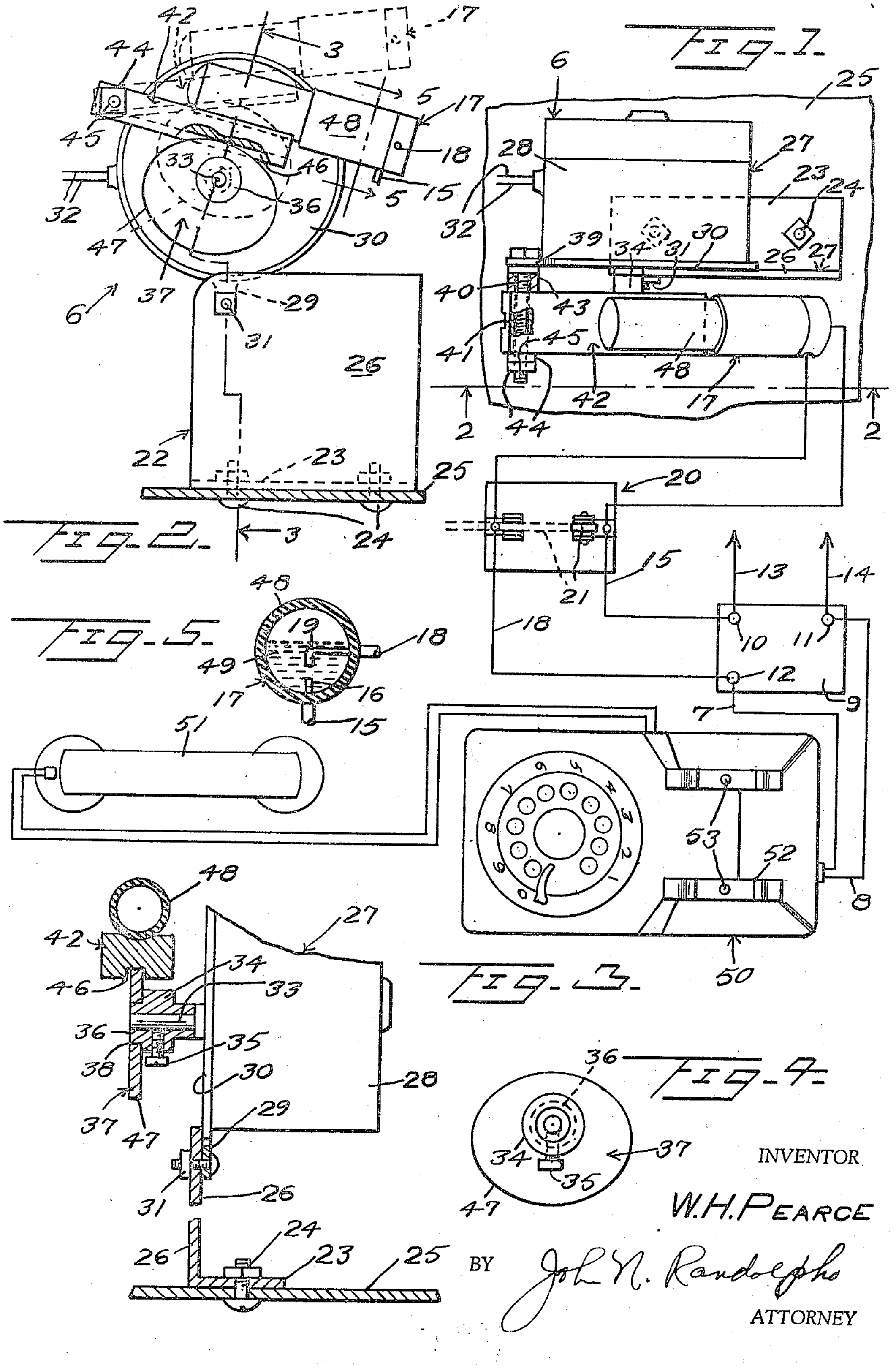
FIGURE 1 is a top plan view, partly broken away, showing the monitoring attachment connected to a conventional telephone instrument.
FIGURE 2 is a vertical sectional view, primarily in front elevation, taken substantially along a plane as indicated by the line 2—2 of FIGURE 1.
FIGURE 3 is an enlarged fragmentary vertical sectional view, taken substantially along the line 3—3 of FIGURE 2.
FIGURE 4 is an enlarged side elevational view looking toward the inner side of a part of the attachment and showing said part detached.
FIGURE 5 is an enlarged cross sectional view taken substantially along a plane as indicated by the line 5—5 of FIGURE 2.

Referring more specifically to the drawing, the monitoring and listening attachment, designated generally 6 and comprising the invention, is shown in FIGURE 1 attached to a conventional telephone instrument 50. As is conventional, two conductor wires 7 and 8 lead from the instrument 50 to a terminal block 9 having at least three terminal posts 10, 11 and 12. Two conductor wires 13 and 14 lead from the posts 10 and 11, respectively, to a central station of the telephone system. The wire 8 is connected to the post 11 and thereby electrically connected to the wire 14, as is conventional; however, the wire 7 instead of being connected to the post 10 and thus to the wire 13, as is the conventional practice, is connected to the post 12 and this constitutes the only modification or alteration in the conventional wiring of the instrument 50.

The monitoring or listening attachment 6 includes a conductor wire 15 which is connected to the post 10 and to a terminal 16 of a conventional mercury type electric switch, designated generally 17. A second conductor wire 18 is connected to the post 12 and to the other terminal 19 of the switch 17.

A conventional knife switch 20 is interposed in the circuit of the wiring 15, 18 between the terminals 10 and 12 and the switch terminals 16 and 19. When a blade 21 of the knife switch 20 is in a closed position, as seen in dotted lines in FIGURE 1, it provides a conductor bridge between portions of the conductors 15 and 18 and thus completes a circuit between the terminals 10 and 12 which does not include the switch 17. This constitutes the position of the switch 20 when the monitoring attachment 6 is not being utilized, and provides an electrical connection between the wires 7 and 13 in the same manner as if the wire 7 was connected directly to the terminal post 10.

The monitoring or listening attachment 6 includes a bracket 22 having a base portion 23 which is secured by nut and bolt fastenings 24 to any suitable horizontal support 25 so that a wall 26, constituting the remainder of said bracket 22, will extend upwardly from the base 23 and be disposed in substantially a vertical plane.

A prime mover 27, such as a small electric motor, includes a case or housing 28. An apertured ear 29 projects outwardly from a portion of the periphery of a front wall 30 of the housing or case 28 and is adjustably clamped by a nut and bolt fastening 31 to an upper portion of the wall 26. As seen in FIGURES 1 and 2, two electrical conductor wires 32 extend from the motor 27 and are adapted to be connected to any conventional source of electrical current, not illustrated. The motor 27 includes a shaft 33 which is journaled in and extends outwardly from the wall 30 and to which a hub 34 is secured by a set screw 35. Hub 34 has an outer portion 36 which is disposed outwardly with respect to the set screw 35 and which has a noncircular periphery.

An oval shaped disc or plate 37, constituting a cam, has an opening 38 which is eccentrically disposed relative to the periphery thereof and which is noncircular to fit detachably but non-rotatably on the periphery of the hub portion 36, so that cam 37 will rotate with the hub 34 and shaft 33.

A second apertured ear 39 projects from another peripheral portion of the front wall 30 and supports a pivot pin 40 which extends forwardly from the front wall 30 and which is disposed somewhat above, spaced from and parallel to the motor shaft 33. The pivot pin 40 extends through a transverse bore 41 formed in one end of an arm 42 which is thus mounted for swinging movement in a vertical plane about the axis of the pin 40 and between a spacing washer 43 and retaining nuts 44 carried by said pin. Nuts 44 engage a threaded outer end 45 of the pin 40. The arm 42 has a groove 46 extending lengthwise of its underside which receives a portion of the periphery 47 of the cam 37 and in which said periphery slides as the cam is revolved with the shaft 33.

The switch 17 includes an elongated capsule 48 of electrical insulating material, part of which is disposed lengthwise on and fixed to the upper side of the part of the arm 42 which is disposed remote from the pivot 40. The two terminals 16 and 19 extend into the other end of the capsule 48 which is disposed beyond the arm 42. The capsule 48 contains a body of electrical conducting material 49 herein disclosed as a mass of mercury.

The motor or prime mover 27 drives the shaft 33 one r.p.m. To place the monitor or listening attachment 6, in operation, the motor 27 is energized for revolving the shaft 33, and the blade 21 of the knife switch 20 is moved to its open full line position, for disconnecting the knife switch from the circuit of the switch 17. The handset 51 is removed from the cradle 52 of the instrument 50 to permit the pushbuttons 53 to be spring biased upwardly to their raised positions, as is conventional. This movement of the pushbuttons 53 to their raised positions closes an electric circuit of the instrument 50 in a conventional manner. Assuming that a telephone call is now made to the instrument 50 from any other telephone instrument, the ringing current will be transmitted through the lines 13 and 14 from the central station of the telephone system. If this occurs while the switch 17 is closed, with the capsule 48 thereof inclined downwardly and outwardly as seen in full lines of FIGURE 2, so that the terminals 16 and 19 are submerged in and bridged by the mercury 49, the calling party will receive a busy signal. The calling party will then hang up and wait a time interval somewhat less than 30 seconds before again dialing the number of the instrument 50.

This time the ringing current will be transmitted through the lines 13 and 14 while the switch 17 is in an open position, as seen in dotted lines in FIGURE 2, with the capsule 48 inclined downwardly toward the pivot 40, so that the mercury 49 will have moved toward the inner end of said capsule and out of engagement with the terminals 16 and 19. This opening of the switch 17 produces the same result as depressing the pushbuttons 53 for opening the switch of the instrument 50 controlled thereby. The party placing the call will then hear the conventional signal indicating that the instrument being called is not in use. When the switch 17 again swings downwardly to its closed full line position of FIGURE 2, it will produce the same result as occurs when the handset 51 is removed from the cradle 52, so that the calling party may then hear any noises audible through the transmitter of the handset 51, intermittently during the intervals while the switch 17 is in a closed position. It will also be apparent that this intermittent opening of the switch 17 while the handset 51 is removed from the cradle 52 will prevent a signal being transmitted from the instrument 50 to the central office as conventionally occurs when the telephone is not in use and the handset is not resting on the cradle and depressing the pushbuttons 53.

The eccentric oval shaped periphery 47 of the cam 37 will maintain the switch 17 closed approximately 25 seconds out of each minute and in an open position for approximately 35 seconds out of each minute. It will be obvious that other cams, not shown, having peripheries of other eccentric shapes, may be substituted for the cam 37 for varying the intervals that the switch can be maintained open and closed during each r.p.m. of the shaft 33.

It will be apparent that the knife switch 20 is provided solely for disconnecting the switch 17 from the wiring of the instrument 50, by closing the blade 21 of said switch, when the attachment 6 is not in use and this same result is accomplished by the switch 17 when in a closed position; however, the switch 20 is provided since the prime mover 27 may stop when the switch 17 is in its open dotted line position of FIGURE 2.

Obviously, other conventional types of prime movers, such as a spring motor, could be substituted for the electric motor 27 for driving hub 34 one r.p.m.

Various other modifications and changes are contemplated and may be resorted to without departing from the function and scope of the invention as hereinafter defined by the appended claims.

I claim as my invention:

1. A monitoring or listening attachment for a conventional telephone instrument comprising an electric switch adapted to be interposed in the wiring connecting a telephone instrument to a central station of a telephone system, and means for intermittently actuating said switch for maintaining the switch alternately in an opened position and a closed position each for a predetermined time interval, whereby when a call is made to said instrument while the handset thereof is removed from the instrument cradle and while said switch is in an open position the call will be completed to the instrument when the switch resumes a closed position and noises audible through the transmitter of said handset will be transmitted to and through the calling instrument intermittently during the time intervals while said switch is in a closed position.

2. An attachment as in claim 1, and manually actuated means adapted to bridge the connection between said switch and the wiring of the telephone in which the switch is interposed for disconnecting said switch from the telephone circuit to enable the telephone circuit to function conventionally.

3. An attachment as in claim 1, said switch including a capsule having two terminals disposed therein and connected to the telephone wires, said capsule containing a fluent body of an electrical conducting material, and said means including a cam for rocking the capsule for causing the fluent body to move alternately into and out of engagement with said terminals for closing and opening the switch, respectively.

4. An attachment as in claim 1, said switch comprising a mercury switch, said means comprising a support for the mercury switch including a part to which the switch is attached, means mounting said part for rocking movement in a vertical plane, and a rotary driven cam having an eccentric periphery on which said part rests for rocking said part and the switch as the cam is revolved for opening and closing the switch.

5. An attachment as in claim 1, said electric switch comprising a mercury switcch, and said means including parts supporting and effecting a rocking movement of the mercury switch for alternately tilting the switch in opposite directions to effect opening and closing of the switch.

References Cited

UNITED STATES PATENTS

| | | | |
|---|---|---|---|
| 2,898,405 | 8/1959 | Eck | 179—1 |
| 3,038,965 | 6/1962 | Civitano | 179—1 |

KATHLEEN H. CLAFFY, *Primary Examiner.*

H. ZELLER, *Assistant Examiner.*